Patented Aug. 3, 1954

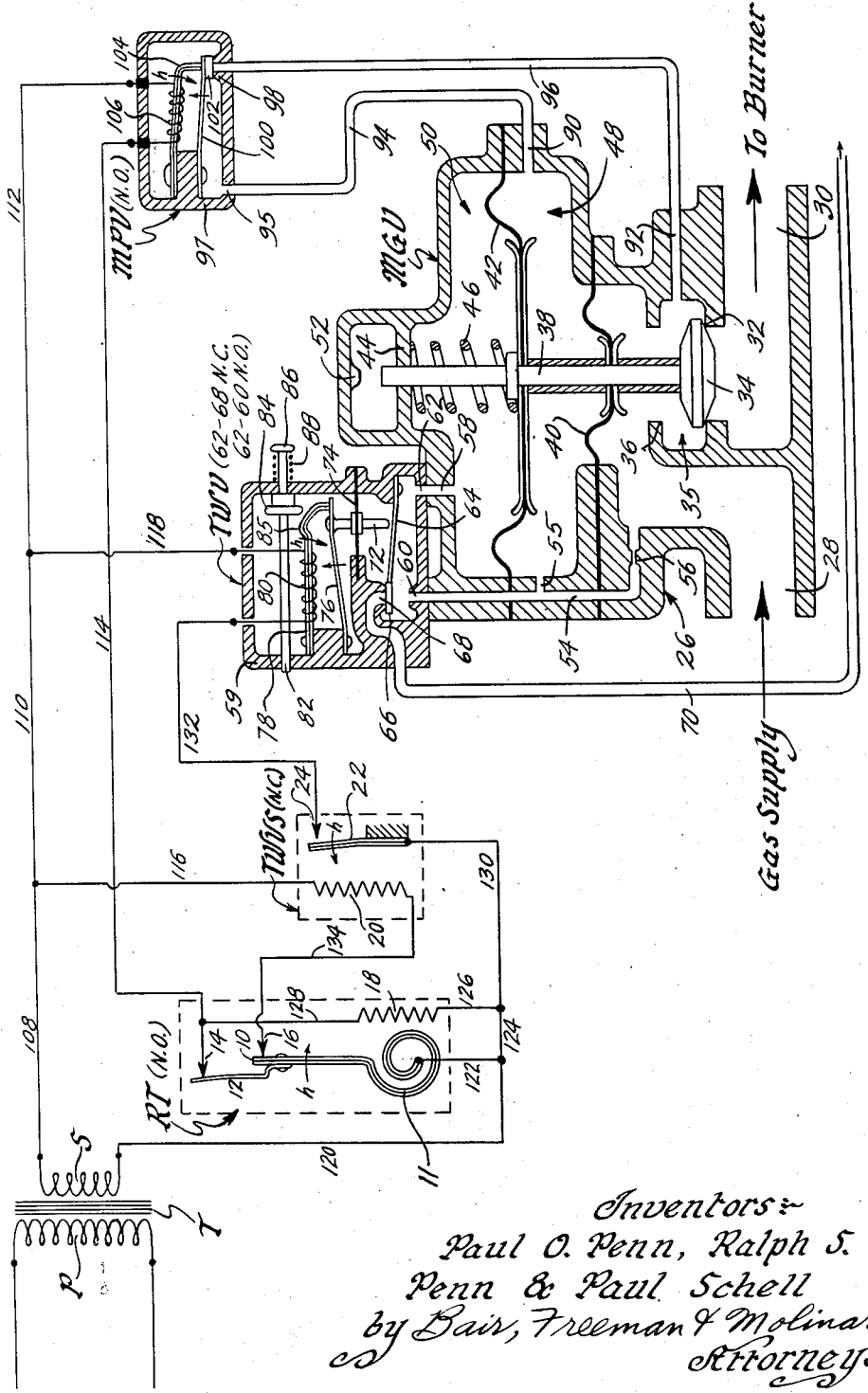

2,685,411

UNITED STATES PATENT OFFICE 2,685,411

MODULATING GAS HEATING CONTROL

Paul O. Penn and Ralph S. Penn, Goshen, and Paul Schell, Elkhart, Ind., assignors to Penn Controls, Inc., Goshen, Ind., a corporation of Indiana Application April 21, 1951, Serial No. 222,168

3 Claims. (Cl. 236—68)

This invention relates to a gas modulating heating control wherein a modulating gas valve of the type having an on-off seat and a modulating seat is provided, automatic control thereof being effected by a room thermostat circuit and pilot control devices in a novel control arrangement.

One object of our invention is to provide pilot control for a main gas valve of modulating type involving relatively simple instrumentalities which operate to control the flow of gas through the gas valve by means of using the gas pressure itself acting on diaphragm for the gas valve, the control instrumentalities being in the form of valves which are electrically operated and a room thermostat being provided for controlling the flow of the electric current to the control instrumentalities in an efficient and fool-proof manner.

Another object is to provide in combination with a modulating gas valve having a diaphragm and chamber arrangement, a modulating pilot valve for controlling the modulating action of the modulating gas valve, and a three-way valve for controlling the on-off positioning of the main gas valve.

A further object is to provide the modulating pilot valve and the three-way valve electrically operable as by means of electric heaters which affect bimetal or similar warping elements which in turn actuate the valves of the modulating pilot valve and the three-way valve, a room thermostat being provided for controlling the energization of the heaters.

Still a further object is to provide a three-way valve switch for controlling the actuating heater of the three-way valve so that its circuit may be closed when a predetermined circuit of the room thermostat is open and vice-versa for providing proper operation of the three-way valve in response to the room thermostat when it responds to temperature rise.

An additional object is to provide a control of the character disclosed in which the modulating pilot valve is modulated by an accelerating heater arrangement of a room thermostat which senses temperature changes of the room and relays them in varying increments of energization to the actuating heater of the modulating pilot valve to cause it to modulate in proportion to changes in room temperature and thus serve as a pilot to accurately modulate the main gas valve to supply the proper amount of gas to the burner and result in maintaining a substantially constant room temperature.

With these and other objects in view, our invention consists in the construction, arrangement and combination of the various parts of our modulating gas heating control, whereby the objects contemplated are attained, as hereinafter more fully set forth, pointed out in our claims and illustrated in the accompanying drawings, wherein:

The figure is a diagrammatic showing of our gas modulating heating control in which the valve structures are shown in cross section in a mechnical part of the diagram and the circuits for them and for the room thermostat are shown in an electro-diagrammatic portion of the figure.

On the accompanying drawing we have used the reference character RT to indicate a room thermostat. The room thermostat is "normally open" as indicated (N. O.) following the designation RT. The room thermostat RT includes secondary switch blade 10 actuated by a bimetal coil 11 responsive to room temperature in the usual manner. Upon temperature rise, the blade 10 swings to the right as indicated by the arrow $h$ indicating "hot". The room thermostat is shown in the non-normal or closed position.

A primary blade 12 is provided and there is a primary contact 14 for coaction therewith, a secondary contact 16 being provided for coaction with the secondary blade 10. The blade 12 is flexible and in the cold position of the room thermostat, both blades 10 and 12 are separated from the respective contacts 16 and 14. Upon temperature rise, the blade 12 engages the contact 14 ahead of engagement of the blade 10 with the contact 16. "Primary" and "Secondary" therefore refer to the order of closing of the contacts 12—14 and 10—16.

An accelerating heater 18 is provided in the room thermostat RT adjacent the bimetal 11 for the purpose of accelerating reclosure of the contacts 12—14 whenever they are separated, for a purpose which will hereinafter appear. The heater 18 is mounted preferably below the bimetal coil 11 for maximum response. A three-way valve switch TWVS is provided having a bimetal blade 22 and a contact 24 for coaction at times therewith. The bimetal switch actuator blade 22 warps to the left when heated as indicated by the arrow $h$. For heating the blade, a three-way valve switch heater 20 is provided. The contacts 22 and 24 of the three-way valve switch are normally closed as indicated on the drawing by (N. C.) following the reference character TWVS.

At MGV a modulating main gas valve is indicated. The valve body bears the reference numeral 26. The valve body 26 has an inlet 28 from the gas supply and an outlet 30 to the burner. Within the valve body an on-off valve seat 32 is provided with which a valve disc 34 is normally engaged under the action of a spring 46. Opposite the seat 32 is a modulating valve seat 36 and between these seats is an interseat chamber 35.

A valve stem 38 is connected with the valve disc 34 and seal-off diaphragms 40 and 42 are connected therewith and with the valve body as illustrated. The diaphragms provide first and second chambers 48 and 50. The upper end of the valve stem 38 extends through a valve stem guide 44 and the valve body may have a projection 52 to serve as a stop for the valve stem 38 in a desirable minimum flame position of the valve disc 34 relative to the modulating seat 36. Preferably the projection 52 is adjustable.

Passageway means is provided in the valve body 26 at 54 and a restriction 56 therein causes 54 to constitute a restricted passageway means to an off seat 60 of a three-way valve TWV having a body 59 and through a lateral passageway 55 to the first chamber 48 between the diaphragms 40 and 42. A passageway 58 is provided through the top of the valve body 26 for communicating a passageway 62 of the three-way valve TWV with the second chamber 50 above the diaphragm 42.

The three-way valve TWV has a valve blade 64 of spring material carrying a valve disc 66. The blade 64 is so shaped as to normally seat the disc 66 against an on seat 68 formed in the body 59 of the three-way valve TWV. A bleed-off connection 70 is provided from the off seat 68 to the burner chamber adjacent the burner therein.

A valve stem 72 is provided for actuating the valve disc 66 with respect to the seats 60 and 68 and it is provided with a seal-off diaphragm 74 to seal the seats 60, 62 and 68 relative to atmosphere through that portion of the valve body 59 above the diaphragm, which portion is in communication with atmosphere.

A valve return spring 76 is provided for normally lifting the valve stem 72 and an electrically operated actuator for the valve is provided in the form of a bimetal valve actuator blade 78 which when heated will warp downwardly against the valve return spring 76 to propel the stem 72 downwardly and close the valve disc 66 against the valve seat 60 after separating it from the seat 68. An actuating heater is provided for the bimetal element and is shown at 80.

We provide manual resetting means for the three-way valve TWV which may comprise a reset rod 82 having a flange 84 thereon to coact with a hump 85 of the bimetal element 78 as will be hereinafter described. A reset knob 86 is provided on the rod 82 and under the knob a reset return spring 88 is provided.

The parts of the three-way valve TWV are normally in the position shown on the drawing and a legend following the reference character TWV indicates that the valve disc 66 normally closes 62 with respect to 68 and normally opens 62 with respect to 60.

The right hand side of the main gas valve body 26 is provided with a passageway 90 to the first chamber 48 and a passageway 92 to the interseat chamber 35. A modulating pilot valve MPV (normally open) is provided having a passageway 95 from which a connection 94 leads to the passageway 90, the body of the valve being indicated at 97. The body has therein a seat 98 connected by a conduit 96 to the passageway 92.

A valve disc 102 is mounted on a valve blade 100 which blade is biased upwardly so as to normally space the disc 102 from the seat 98 to open 95 with respect to 98.

For closing the disc 102 against the seat 98 and for modulating the disc relative to the seat between the normally open position and the closed position, I provide a bimetal valve actuator blade 104. An actuating heater 106 is wound thereon for changing the position of the bimetal blade 104 in response to the duration and frequency of energization of the heater 106.

The foregoing elements are connected in an electric circuit which may include a step-down transformer T having a primary P and a secondary S so that comparatively safe low voltage may be used for actuating the various elements of our control. The elements thus far described are connected together with wires 108 to 134 as shown on the drawing and these wires will be referred to specifically hereinafter when describing the operation of the control.

*Practical operation*

As shown on the drawings, the various parts of our control are in the position which they assume as a result of the room thermostat RT being satisfied. The three-way valve switch heater 20 is energized through the elements 108, 116, (20), 134, 16, 10, 11, 122 and 120. The bimetal 22 is accordingly in position for opening the circuit of the heater 80 of the three-way valve TWV. The valve is therefore in the normal position which results in the modulating main gas valve MGV being closed (disc 34 against on-off seat 32). This results from gas through the restricted passageway means 54—56 flowing through 60, 62 and 58 into the second chamber 50 thus balancing the pressure in this chamber with respect to the pressure through 55 in the first chamber 48. The spring 46 is therefore effective to hold the valve 34 closed against the seat 32.

Since the primary contacts 12 and 14 of the room thermostat are closed, the heater 106 of the modulating pilot valve MPV is energized through 108, 110, 112, (106), 114, 14, 12, 10, 11, 122 and 120. The valve disc 102 is therefore seated against the seat 98 to cut off communication between the interseat chamber 35 and the first chamber 48.

As the room temperature goes down, the bimetal 11 of the room thermostat will unwind and swing the blade 10 toward the left (since the accelerating heater 18 shunts the primary contacts 14 it will be shunted out of the circuit and therefore cold) thus breaking the circuit at 10—16 (the secondary contacts) of the room thermostat. This de-energizes the heater 20 so that the three-way valve switch will close a circuit through its contacts 22 and 24. This is the circuit for the heater 80 through 108, 110, 118, (80), 132, 24, 22, 130, 124 and 120.

As the heater 80 heats up, it warps the bimetal blade 78 downwardly against the upward bias of the valve return spring 76 thus driving the stem 72 downwardly and transferring the valve disc 66 from the on seat 68 to the off seat 60. This cuts off the flow of gas from the passageway 54 through 60, 62 and 58 to the second chamber 50 of the gas valve MGV and opens this chamber through 58, 60 and 68 to the bleed-off connection 70. The gas under pressure in the chamber 50 is therefore bled off to reduce this chamber to substantially atmospheric pressure so that the pressure from the inlet 28 under the diaphragm 40 and through the restricted passages means 54—56 and the lateral passageway 55 to the primary chamber 48 under the diaphragm 42 will result in upward movement of the valve stem 38 to open the gas valve disc 34 relative to the on-off seat 32 and bring it adjacent the modulating seat 36 but spaced therefrom as determined by the minimum flame stop 52. The modulating gas valve is now open so that gas to the burner flows through the valve and of course is ignited in any suitable manner at the burner.

The room temperature will continue to lower and after a fractional degree of temperature drop will open the room theremostat at the primary contacts 12—14. This permits the energization of the heater 106 of the modulating pilot valve to be reduced greatly as its circuit is then through the wires 124, 126 and 128 and the accelerating heater 18 instead of directly across the primary contacts of the room thermostat which have negligible resistance, the resistance of 18 being much greater than the resistance of 106. Accordingly, the bimetal element 104 of the modulating pilot valve will warp upwardly for opening the valve disc 102 with respect to the valve seat 98. This permits bleed off of the pressure in the first chamber 48 of the modulating gas valve to the interseat chamber 35 which of course flows to the burner chamber to be disposed of by burning therein.

Reduction of pressure in the chamber 48 will permit the disc 34 to move away from the modulating seat 36 and the degree of such movement will be dependent upon the degree of opening of the disc 102 relative to the seat 98 of the modulating pilot valve. The passageways 90, 94, 95, 98, 96 and 92 for this purpose are larger than the restriction 56 so as to let the gas under pressure out of the chamber 48 faster than it enters from the intake 28 if the gas valve is to be modulated to a wider open position.

On the other hand, if it is to be modulated to a more closed position with relation to the seat 36, the valve 102 restricts the flow from 90 to 92 more than the restriction 56, the position of the valve disc 102 being dependent therefore upon the position or degree of warping of the bimetal element 104.

As soon as the contacts 12 and 14 are separated, the flow of current through the accelerating heater 18 will cause the room thermostat to close again at 12—14 even though the room temperature is dropping. As soon as it is closed, the accelerating heater 18 is shunted out of the circuit and at the same time a "shot" of heat is provided for the bimetal element 104 by a short period of energization of the heater 106. The energization of the heater 106 is such that it adds or reduces the heat affecting the bimetal 104 in the inverse ratio to the requirements of the space being heated. The contacts in the thermostat are of the walking type which means that more or less heat can be added to the bimetal 104 by very slight effects of room temperature on the room thermostat. The greater the period of energization of the heater 106, the more nearly closed will be the modulating pilot valve and likewise the more open will be the modulating gas valve (its valve disc 34 relative to the modulating seat 36).

As the room thermostat becomes satisfied and the primary contacts 12—14 close completely, any further increase in the room temperature closes the secondary contacts 16—16 for re-energizing the heater 20 of three-way valve switch and thereby opening the circuit of the heater 80 of the three-way valve. This of course results in causing the valve disc 66 to revert to its normal position as shown on the drawing for closing the modulating gas valve completely, thus completing the cycle of bringing the parts back to the position shown on the drawing.

From the foregoing description, it will be obvious that the first demand for heat by the room thermostat opens the modulating gas valve to its fully modulated position (minimum position as determined by the stop 52) and any additional demand of the room thermostat for heat in the space being heated reduces the heat applied to the bimetal 104 of the modulating pilot valve by the heater 106 and results in opening the modulating gas valve to a further open position. The accelerating heater 18 must of necessity be of a relatively high value so that there is relatively little current flow in the heater 106 of the modulating pilot valve and heat is radiated from the accelerating heater to the bimetal 11 during the time the room thermostat contacts 12 and 14 are open. The primary purpose of the accelerating heater is to accelerate the cycling of the room thermostat bimetal 11.

The heater 18 is preferably below and very close to the bimetal 11 so that when heat first radiates from the heater, it has a very quick effect upon the bimetal for tending to move the contact blade 12 in the opposite direction from that which a reduction in room temperature would cause. This means that the thermostat contacts cycle rather rapidly so that the amount of heat affecting the bimetal element 104 of the modulating pilot valve, even though it is caused by impulses of varying amounts and duration of current energizing the heater 106, averages out to a certain value depending upon the effect of the room thermostat upon the circuit.

The room thermostat part of the modulating circuit may be considered as a sender and the heater 106 as a receiver and the sender, under certain conditions, may cycle at a rate, for example, one second on and two seconds off. This rate will vary to greater or lesser proportions of the time on as dictated by the temperature of the surroundings which affect the bimetal 11 and also the voltage as applied to the circuit. The receiver which in this case is the heater 106 of the pilot modulating valve may be, however not necessarily is, of somewhat greater mass than that of the sender and the response will be that indicated by an integration of the on and off timing of the sender. In actual practice, we have found that the receiver is very smooth in operation from sudden changes by the sender and also is relatively quick in its response to any changes by the sender.

The room thermostat is a two-stage thermostat in which the contacts closing first are those which supply current to the modulating pilot valve which in turn controls the modulating gas valve, this valve being the main valve between the gas supply and the burner. The contacts then that close second are for controlling the on and off position of the main valve, so that in a certain temperature range the main valve is modulated between minimum flame position and maximum opening, but at a slightly higher temperature is cut off entirely. Then when the room thermostat again calls for heat, the secondary contacts open first to turn the valve on to its minimum modulated position and thereafter the primary contacts control the main valve in a modulating manner.

Our disclosed modulating gas heating control is a comparatively simple arrangement of two pilot valves for a modulating gas valve in which one of the pilot valves effects the on-off control of the gas valve and the other effects modulation thereof, and the pilot valves are controlled in a simple yet effective manner by a two-stage thermostat having therein the accelerating heater 18 to secure the desired cycling of the room thermostat to effect primarily modulation of the pilot valve and secondly modulation of the gas valve under the control of the pilot valve.

The three-way valve TWV is preferably of the snap acting type and is provided with the manual reset mechanism 82—84—85—86—88 so that the modulating gas valve can be opened under manual control by pressure inwardly on the reset knob 86. This causes the flange 84 to ride over the hump 85 and move the valve disc 66 to the non-normal position (seated against the seat 60). Thereupon the gas in the chamber 50 is reduced through the bleed-off passageway 70 for permitting the pressure under the diaphragm 42 to open the valve to its modulating position against the action of the spring 46. Thereafter, when current flows in the heater 80, the bimetal 78 will warp downwardly for releasing the hump 85 from the flange 84 and the spring 88 will return the manual reset to its normal position and permit subsequent automatic operation of the three-way valve in the normal manner.

Some changes may be made in the construction and arrangement of the parts of our modulating gas heating control without departing from the real spirit and purpose of our invention, and it is our intention to cover by our claims any modified forms of structure or use of mechanical equivalents which may be reasonably included within their scope.

We claim as our invention:

1. In a modulating gas heating control, a modulating gas valve having an on-off seat, a modulating seat, a first chamber between said seats and a valve plug in said first chamber to coact with said seats, a first diaphragm dividing the valve body into second and third chambers, a second diaphragm isolating said third chamber from said first chamber, a stem connection between said valve plug and said diaphragms, restricted passageway means continuously supplying gas to said third chamber, a modulating pilot valve connecting said third chamber with said first chamber, an electrically operated actuating mechanism therefor, a three-way valve for connecting said second chamber to either said restricted passageway means for admitting gas thereto to close said valve plug on said on-off seat or for exhausting gas therefrom to open said valve plug relative to said on-off seat, an electrically operated actuator for said three-way valve, and a room thermostat having primary and secondary contacts and an accelerating heater, said primary contacts closing ahead of said secondary contacts on temperature rise affecting said room thermostat, said primary contacts being in circuit with said modulating pilot valve actuator to energize it when a circuit is established by closure of said primary contacts upon the room thermostat responding to room temperature rise and to thereby close said modulating pilot valve to permit increase of pressure in said third chamber from said restricted passageway means to move said valve plug toward said modulating seat for reducing gas flow through said gas valve, said accelerating heater shunting said primary contacts so as to be energized when they are separated, and said secondary contacts being in circuit with said three-way valve actuator to cause said three-way valve to connect said second chamber to said restricted passageway means and thereby effect closure of said valve plug on said on-off seat.

2. A normally closed modulating gas valve having an on-off seat, a modulating seat, a first chamber between said seats and a valve plug in said first chamber to coact with said seats, a first diaphragm dividing the valve body into second and third chambers, a second diaphragm isolating said third chamber from said first chamber, a stem connection between said valve plug and said diaphragms, restricted passageway means continuously supplying gas to said third chamber, a modulating pilot valve connecting said third chamber with said first chamber, an electrically operated actuator therefor, a three-way valve for connecting said second chamber to either said restricted passageway means for admitting gas thereto to close said valve plug on said on-off seat or for exhausting gas therefrom to open said valve plug relative to said on-off seat, said three-way valve being normally in the first position, an electrically operated actuator for said three-way valve for causing it to connect said second chamber to the burner when the actuator is energized, a room thermostat having primary and secondary contacts and an accelerating heater, said primary contacts closing ahead of said secondary contacts on temperature rise affecting said room thermostat, said primary contacts being in circuit with said modulating pilot valve actuator to energize it when a circuit is established through said room thermostat upon the same responding to temperature rise and to thereby close said modulating pilot valve to permit increase of pressure in said third chamber from said restricted passageway means to move said valve plug toward said modulating seat for reducing gas flow through said gas valve, said accelerating heater shunting said primary contacts so as to be energized when they are separated, and means for connecting said secondary contacts in circuit with said three-way valve actuator, said last means comprising a thermal responsive switch for energizing said three-way valve actuator and a heater controlled by said secondary contacts of said room thermostat and operable to open said thermal responsive switch.

3. A normally closed modulating gas valve having an on-off seat, a modulating seat, a first chamber between said seats and a valve plug in said first chamber to coact with said seats, a first diaphragm dividing the valve body into second and third chambers, a second diaphragm isolating said third chamber from said first chamber, an operative connection between said valve plug and said diaphragms, restricted passageway means continuously supplying gas to said third chamber, a modulating pilot valve connecting said third chamber with said first chamber, an electrically operated actuator therefor, a three-way valve for connecting said second chamber to either said restricted passageway means for admitting gas thereto to close said valve plug on said on-off seat or for exhausting gas therefrom to open said valve plug relative to said on-off seat, said three-way valve being normally in the former position, manually operated reset means for moving it to its other position, said second electrically operated actuator actuating said three-way valve for connecting said second chamber to a burner when the actuator is energized subsequent to manual reset and at that time tripping said reset mechanism to effect resumption of automatic operation of said three-way valve in response to its electrically operated actuator, and a room thermostat having primary and secondary contacts and an accelerating heater, said primary contacts closing ahead of said secondary contacts on temperature rise affecting said room thermostat and to thereby close said modulating pilot valve to permit increase of pressure in said third chamber from said restricted passageway means to move said valve plug toward said modulating seat for reducing gas flow through said gas valve said primary contacts being in circuit with said modulating pilot valve actuator to energize it when a circuit is established through said primary contacts of said room thermostat, said accelerating heater shunting said primary contacts so as to be energized when the same are separated, and said secondary contacts being connected in circuit with said three-way valve actuator to actuate it to the position in which it connects said second chamber to said restricted passageway means and thereby effects closure of said modulating gas valve.

References Cited in the file of this patent

UNITED STATES PATENTS

| Number | Name | Date |
|---|---|---|
| 1,818,546 | Evans | Aug. 11, 1931 |
| 2,006,658 | Smulski | July 2, 1935 |
| 2,285,913 | Derrah | June 9, 1942 |
| 2,328,279 | Jones | Aug. 31, 1943 |
| 2,490,420 | Davis | Dec. 6, 1949 |

FOREIGN PATENTS

| Number | Country | Date |
|---|---|---|
| 711,150 | France | June 23, 1931 |